W. JOHNSON.
EGG CARRIER.
APPLICATION FILED MAR. 22, 1911.

1,004,791.

Patented Oct. 3, 1911.

Witnesses
Jos. F. Collins
Florence H. Monk

Inventor
Walter Johnson
George E. Hall
Attorney

UNITED STATES PATENT OFFICE.

WALTER JOHNSON, OF MIDDLETOWN, CONNECTICUT.

EGG-CARRIER.

1,004,791.  Specification of Letters Patent.  Patented Oct. 3, 1911.

Application filed March 22, 1911. Serial No. 616,251.

*To all whom it may concern:*

Be it known that I, WALTER JOHNSON, a citizen of the United States, residing at Middletown, in the county of Middlesex and State of Connecticut, have invented certain new and useful Improvements in Egg-Carriers, of which the following is a specification, reference being had therein to the accompanying drawings.

My invention relates to new and useful improvements in egg carriers, and has for its object, among other things, to provide a simple and economical device for safely transporting and delivering eggs, that may be produced at the minimum cost.

To these, and other ends, my invention consists in the egg carrier having certain details of construction and combinations of parts, as will be hereinafter described and more particularly pointed out in the claim.

Figure 1:
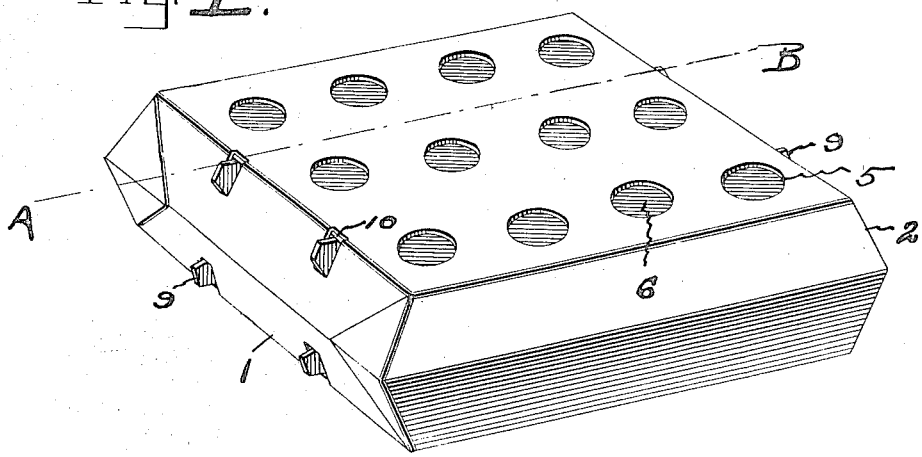
Figure 2:
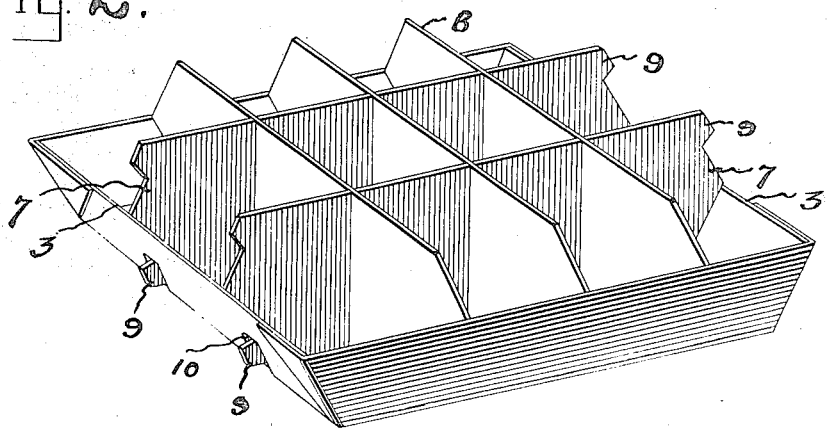
Figure 3:
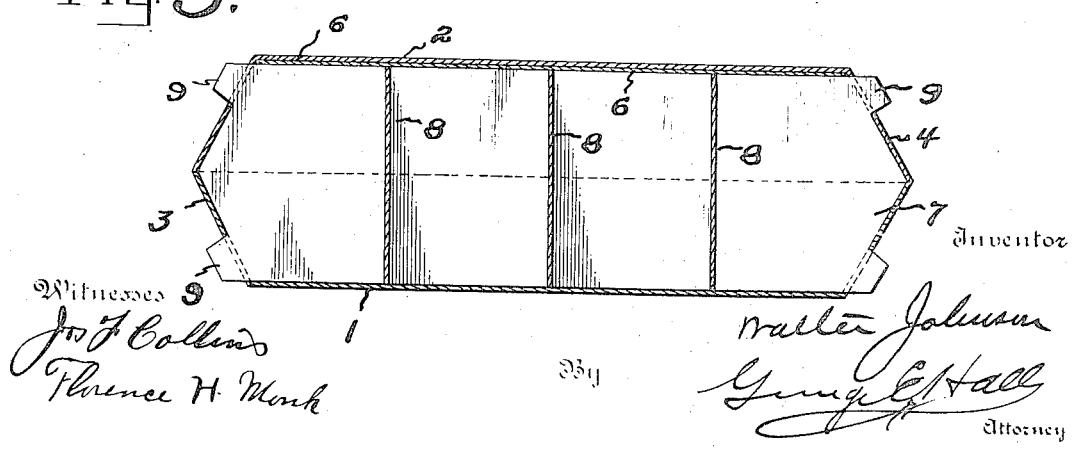

Referring to the drawings, in which like numerals of reference designate like parts in the several figures; Figure 1 is a perspective view of my improved egg carrier with the bottom tray shown upon the upper side thereof for the purpose of more clearly illustrating its construction; Fig. 2 is a perspective view thereof with the top tray removed; and Fig. 3 is a sectional view of the parts taken upon line A—B of Fig. 1.

In the practice of my invention I provide two trays 1 and 2, which are preferably made of cardboard with outwardly flaring sides 3 and 4, both trays being of the same shape and size, the tray 1 having a solid bottom and the tray 2 having a plurality of openings 5 therein, and an auxiliary bottom 6. The trays are divided into compartments by means of interior division plates 7 and 8, the plates 7 having locking wings 9 at each end, which project through openings 10 in the sides 3 and 4, and securely hold the plates therein against accidental dislodgment.

In one of the drawings I have illustrated a carrier with one dozen compartments, each designed to hold a single egg, and the openings 5 are so arranged and spaced that they are substantially in the center of each of said compartments. Either or both of the trays may be provided with said openings 5, but I prefer particularly to apply them to the bottom tray so that as the eggs are dropped into the compartments they strike the auxiliary bottom 6 over the perforations 5, which yields slightly and prevents breakage of the egg.

After the eggs are placed in the compartments of the lower tray the upper tray is secured to the lower tray and the division plates by snapping the wings 9 through the openings 10 therein. The contents of the carrier are readily removed by taking off the upper tray and with it the division plates 7, so that the lower tray is not divided into compartments and the eggs lie in a group therein.

This egg carrier is especially valuable in the delivery trade, as one of the trays without the division plates may be left with the customer and the other tray and the division plates used again, the only cost to the party delivering the goods being that of a single tray, which if necessary, may be made of lighter and cheaper material than the other tray.

There are minor changes and alterations that can be made within my invention, and I would therefore have it understood that I do not limit myself to the exact construction herein shown and described, but claim all that falls fairly within the spirit and scope of my invention.

Having described my invention, what I claim as new and desire to secure by Letters Patent, is:—

The combination with two trays, of substantially like structure and form, each tray being complete in itself, held together by means other than interior divisional plates, and having wing openings in two opposite sides thereof; of a plurality of divisional plates, of substantially the same height as the depth of both of said trays, all of the plates lying in one direction being of substantially the same length as the width between two sides of said trays, and the other plate or plates lying at substantially a right angle thereto, said latter plates having two wings upon each end thereof, located one above and the other below the horizontal center of said plate, and projecting through the wing openings of said trays, when said trays are assembled with their open ends together, and thereby separably securing said plates to said trays, and said trays to each other, the said horizontal center of said division plates being in substantially the same plane as the meeting edges of said trays.

In testimony whereof I affix my signature in presence of two witnesses.

WALTER JOHNSON.

Witnesses:
GEORGE E. HALL,
JOHN H. BELDEN.